United States Patent [19]

Baer et al.

[11] Patent Number: 4,846,109

[45] Date of Patent: Jul. 11, 1989

[54] ANIMAL SHIPPING CONTAINER

[75] Inventors: John S. Baer, Bar Harbor, Me.; John H. Weatherby, East Stroudsburg, Pa.

[73] Assignee: The Jackson Laboratory, Bar Harbor, Me.

[21] Appl. No.: 82,854

[22] Filed: Aug. 5, 1987

[51] Int. Cl.[4] .............................................. A01K 1/00
[52] U.S. Cl. ...................................... 119/19; 229/6 A
[58] Field of Search ............................. 119/15, 17, 19; 220/4 B, 4 E, 319, 430, 431; 229/6 A, 125.27

[56] References Cited

U.S. PATENT DOCUMENTS

| | | |
|---|---|---|
| 1,582,296 | 1/1929 | Neighbauer . |
| 2,026,417 | 12/1935 | Conway et al. ........................ 119/19 |
| 2,627,991 | 2/1953 | Maersch . |
| 2,663,450 | 12/1953 | Bourcart . |
| 2,678,143 | 4/1954 | Dillingham et al. . |
| 2,681,142 | 1/1954 | Cohen . |
| 2,709,534 | 3/1955 | Johnson et al. . |
| 2,784,893 | 3/1957 | Hill .............................. 229/125.27 X |
| 2,900,955 | 8/1959 | Danielsen ........................... 229/6 A |
| 3,108,569 | 10/1963 | Kundikoff .............................. 119/19 |
| 3,306,258 | 2/1967 | Hunt ..................................... 119/19 |
| 3,339,725 | 9/1967 | Hamilton . |
| 3,602,455 | 8/1971 | Lewis et al. ......................... 242/129 |
| 3,654,746 | 4/1972 | Beckers .................................. 53/37 |
| 3,710,761 | 1/1973 | Gregory ................................. 119/19 |
| 3,902,540 | 9/1975 | Commisso .............................. 150/0.5 |
| 3,933,295 | 1/1976 | Congleton ............................. 229/2.5 |
| 4,141,448 | 2/1979 | Mascia et al. ........................ 206/485 |
| 4,245,773 | 1/1981 | Stollberg .............................. 229/33 |
| 4,482,051 | 11/1984 | Cantey, Jr. ........................... 206/392 |
| 4,494,650 | 1/1985 | Cullen .................................... 206/45 |
| 4,499,997 | 2/1985 | Swingley, Jr. ....................... 206/509 |
| 4,545,487 | 10/1985 | Asmus .................................. 206/508 |
| 4,632,249 | 12/1986 | Blot ...................................... 206/431 |

FOREIGN PATENT DOCUMENTS 2404058  8/1975  Fed. Rep. of Germany ........ 119/19

Primary Examiner—Robert P. Swiatek
Attorney, Agent, or Firm—Daniel H. Kane, Jr.

[57] ABSTRACT

Laboratory animal shipping containers having a generally cylindrical configuration container housing may be stacked and the stacks placed in a close packing density arrangement while still affording adequate air ventilation substantially entirely around the containers. The generally cylindrical configuration container housing is formed by two substantially symmetrical and interchangeable mating halves each having a substantially circular base and a ventilated side wall depending or extending from the base. A plurality of mating tabs or flanges extend from the perimeter of the side wall of each mating half. A slotted strap or locking band is formed with elongate spaced slots around the locking band for sliding over flush pairs of mating tabs around the middle of the container for securing the mating halves together at the roots of the tabs. Radial partitions define a plurality of compartments within the container housing. At least one base is formed with score lines or tear lines defining a plurality of holes to be opened along the score lines for loading or unloading animals in the respective compartments. A plurality of inner score lines or tear lines define loading holes. Lids are provided for securely covering the loading holes during shipping. A plurality of outer score lines or tear lines are formed around at least a portion of the inner score lines and define the unloading holes.

27 Claims, 4 Drawing Sheets

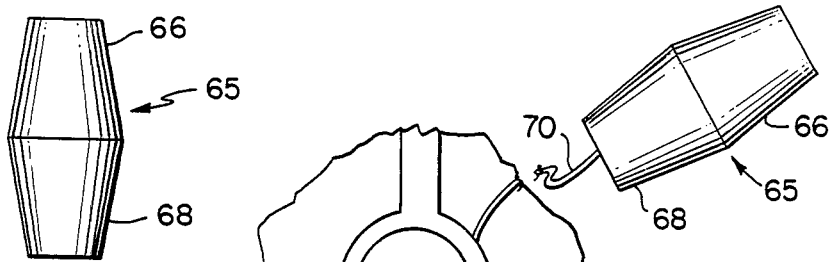
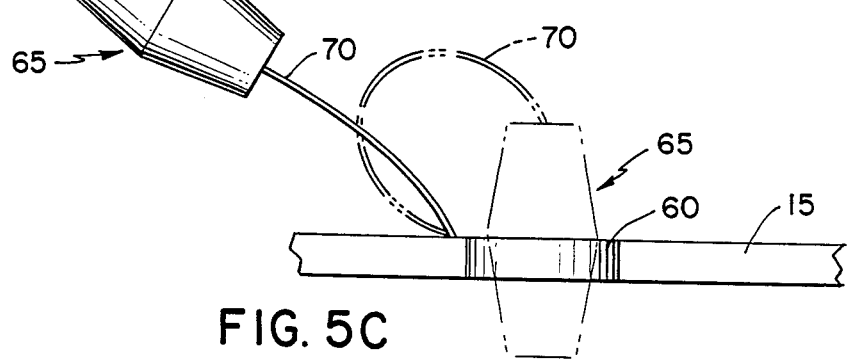
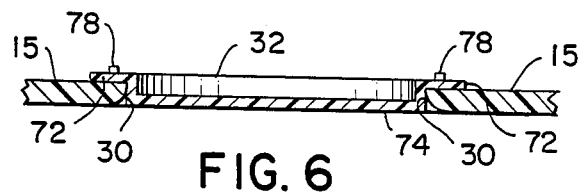
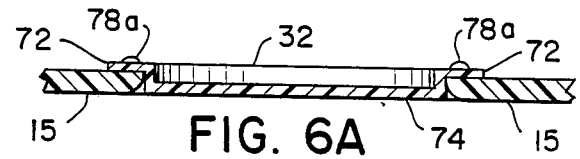
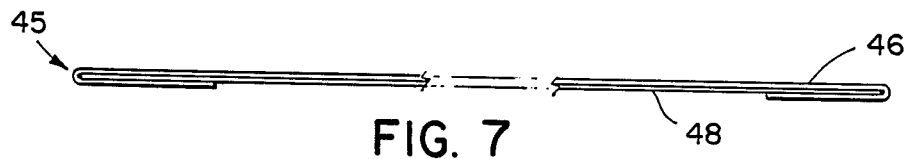

ANIMAL SHIPPING CONTAINER

TECHNICAL FIELD

This invention relates to a new animal shipping container and in particular to a container for shipping small laboratory animals such as mice and rats.

BACKGROUND ART

Conventional shipping containers for laboratory animals generally have an elongate rectangular configuration. Ventilated walls are provided for example at the top, at least one end and both sides of the container. A disadvantage of this conventional configuration is that adequate air ventilation may be cut off when the shipping containers are stacked and packed with close packing density.

Such shipping containers are generally partitioned into separate compartments. Another disadvantage of the conventional configuration is that controlled access limited to a single compartment at a time for loading and unloading the compartment is inconvenient or may not be possible. Arrangements must also be made in the case of small laboratory animal rodents to assure that the shipping containers are rodent proof.

OBJECTS OF THE INVENTION

It is therefore an object of the present invention to provide a new animal shipping container having a configuration which affords adequate air ventilation entirely around the container even in the case of close packing and stacking of the containers in the most dense container packing arrangement.

Another object of the invention is to provide a new multi-compartment animal shipping container which is rodent proof and which permits separate controlled access to each of the different compartments for loading and unloading animals.

A further object of the invention is to provide an animal shipping container which is symmetrical with replaceable and interchangeable mating halves on either side of a central plane with respect to the top and bottom of the container to simplify manufacturing and reduce expense.

DISCLOSURE OF THE INVENTION

In order to accomplish these results the present invention provides a laboratory animal shipping container having a generally cylindrical configuration container housing formed by upper and lower substantially circular bases and ventilated side walls extending between the bases. A feature and advantage of this configuration is that the containers may be stacked and the stacks placed in a close packing density arrangement while still affording adequate air ventilation substantially entirely around the containers.

In the preferred embodiment the generally cylindrical configuration container housing is formed by two substantially symmetrical and interchangeable mating halves each having a substantially circular base and a ventilated side wall depending or extending from the base. A plurality of mating tabs or flanges extend from the perimeter of the side wall of each mating half for flush engagement of pairs of mating tabs from the respective mating halves around the middle of the container. According to the invention a slotted strap or locking band is provided formed with elongate spaced slots around the locking band for sliding over flush pairs of mating tabs around the middle of the container for securing the mating halves together at the roots of the tabs.

The side walls depending or extending from each base of the mating halves may be tapered outwardly from the base to form an expanded circular waist around the middle of the housing with waist diameter slightly greater than the base diameter. A feature and advantage of this arrangement is that air ventilation is further facilitated and a screening wall may be accommodated around the circumference of the container inside the outwardly tapering side walls. Such a screening wall may be for example a metal screen forming a boundary around the perimeter of the respective bases facing the small laboratory animals, for example rodents, contained in the shipping container. An air filter layer is included adjacent to the metal screen facing the outer side walls.

The invention contemplates partitions defining a plurality of compartments within the container housing. According to the preferred example embodiment the partitions are radial partitions extending between the bases of the respective mating halves defining sector or pie shaped compartments within the container housing. The bases may be formed with indented radial grooves for receiving the partitions as well as a circular perimeter groove for receiving the screening wall forming the outer boundary of the sector shaped or pie shaped compartments.

The container halves may be formed with a central opening at the center of each base and a center post positioned in the container with hollow or open ends aligned with the central opening of each base. Elongate stacking lugs tapered at each end are provided for inserting in the aligned central openings and hollow end center posts of adjacent containers for stacking the containers in a stable high density packing arrangement. The radial partitions may be integrally molded with and radiate from the center post.

According to another unique feature of the invention at least one base is formed with score lines or tear lines defining a plurality of holes to be opened along the score lines for loading or unloading animals in the respective compartments of the container housing. A feature and advantage of this arrangement is that controlled access is afforded to each of the separate compartments for loading and unloading animals without interference with the other compartments.

In the preferred example at least one base is formed with a plurality of inner score lines or tear lines defining loading holes to be opened along the inner score line for loading animals into the respective compartments of the container housing. Lids are provided for securely covering the loading holes during shipping of the animal shipping container after the animals have been loaded. A plurality of outer score lines or tear lines are formed around at least a portion of the inner score lines. The outer score lines or tear lines define unloading holes to be opened along the outer score line for removing the shipped animals from the respective compartments. Tabs may be provided to facilitate tearing or opening along the respective score lines.

Except for the screening wall and air filter, the entire animal shipping container may be formed of molded plastic. A feature and advantage of the symmetry of the present invention is that the upper and lower mating halves may be identical using the same molded piece having a substantially circular base formed with inner and outer score lines or tab lines and depending or extending ventilated side walls. A pair of interchangeable mating halves are then secured about the "waist" by sliding the slots of the locking band or strap over the mating tabs. A feature and advantage of the slotted strap is that the mating halves are retained together by the holding action of the band slots at the roots of the tabs. The ends of the strap do not have to be secured for the purpose of holding the mating halves together because it is the action of the band slots at the roots of the flush tabs which holds the mating halves together. The ends of the strap or band are secured together however, by, for example bonding or heat welding or sonic welding so that the locking band and container are "tamper" proof. The slotted strap or band may also bear indicia indicating which half of the container is "up" forming the top half or "cover" of the container.

Other objects, features and advantages of the invention are apparent in the following specification and accompanying drawings.

BRIEF DESCRIPTION OF THE DRAWINGS

FIG. 5A is a detailed side view of one of the stacking lugs.

FIG. 5B is a fragmentary plan view and FIG. 5C a fragmentary side view in partial cross section showing a portion of the base of a molded container half at the center of the base with the molded stacking lugs secured to the base by a web.

FIG. 6 is a fragmentary side cross section of a portion of the base of a mating half of the container housing selected as the cover showing a lid or sealing cap inserted in place for securing in a loading hole; and FIG. 6A is the same view showing the lid or sealing cap secured in place by heat or sonic welding.

FIG. 7 is a detailed end view of the internal screening wall forming the circular boundary of the compartments of the container and composed of a metal screen and air filter material.

DESCRIPTION OF PREFERRED EXAMPLE EMBODIMENTS & BEST MODE OF THE INVENTION

Figure 1:
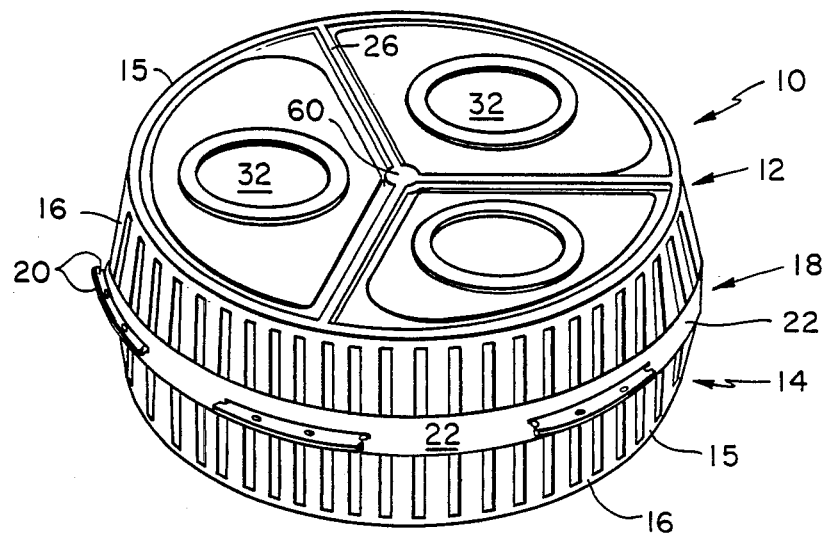
FIG. 1 is a perspective view of the assembled animal shipping container according to the invention as it appears after animals are loaded or packaged in the container for shipping.

A laboratory animal shipping container 10 according to the invention is shown in assembled form in FIG. 1 as it would appear after animals such as mice or rats have been loaded for shipment. The generally cylindrical container housing is formed by two symmetrical and interchangeable mating halves 12 and 14. Each mating half 12, 14 is formed with a substantially circular base 15 with ventilated side wall 16 depending or extending from the base 15. The side walls 16 taper outwardly with a slight taper and meet to form a circular "waist" 18 around the middle of the container housing having a diameter slightly greater than the diameter of each base 15.

Figure 2:
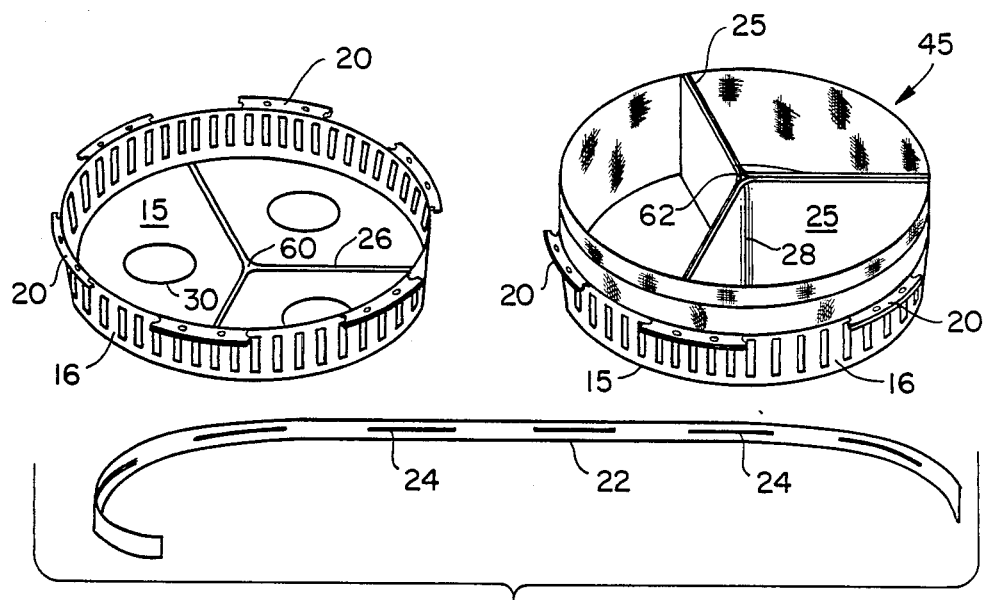
FIG. 2 is a detailed perspective view of the animal shipping container with the slotted locking band and one of the mating halves serving as the cover half removed.
Figure 3:
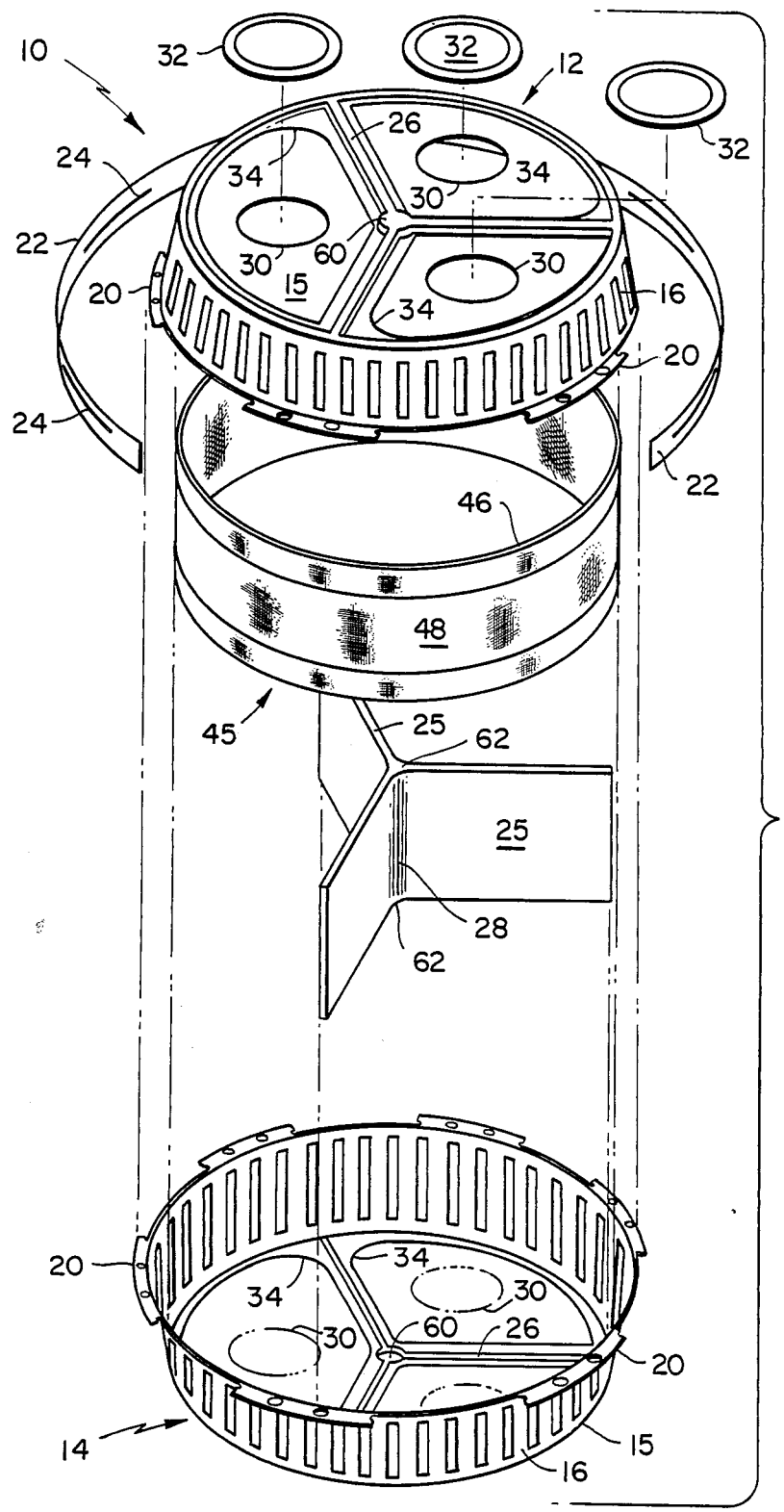
FIG. 3 is an exploded view of the animal shipping container showing the loading holes also exploded but showing unloading holes intact and unopened.

As shown also in FIGS. 2 and 3 each mating half 12, 14 of container 10 is formed with a number of mating tabs or flanges 20 extending from the perimeter of the side wall 16 for flush engagement of pairs of mating tabs 20 from the respective mating halves 12, 14 around the middle of the container. The slotted locking band or strap 22 is formed with elongate slots 24 spaced around the band. The slots 24 slide over flush pairs of mating tabs 20 securing the halves together at the roots of the tabs.

As shown in FIGS. 2 and 3, radial partitions 25 extend between the bases 15 of the two mating halves 12, 14 forming, in this example three sector or "pie" shaped compartments within the container and providing structural support between the bases 15. The bases 15 may be formed with radial grooves or recesses 26 for receiving the partitions 25. The recesses are formed with square edges for a tight fit with the partitions so that the joints are without spaces for teeth or claws providing rodent-proof compartments. The radial partitions 25 "radiate" from a common center forming an effective center post 28.

Each base 15 of the respective mating halves 12, 14 is formed with a plurality of inner score lines or tear lines 30, in this example three, one for each compartment. The inner score lines in this instance are of circular connfiguration and define circular loading holes to be opened along the score lines 30 for loading animals into the respective compartments. Tabs (not shown) may be provided to facilitate pulling and opening the loading holes in the base 15. The circle of material removed from the base 15 is discarded. After loading animals in the respective compartments lids 32 are provided which are secured in the loading holes as hereafter described.

Figure 4:
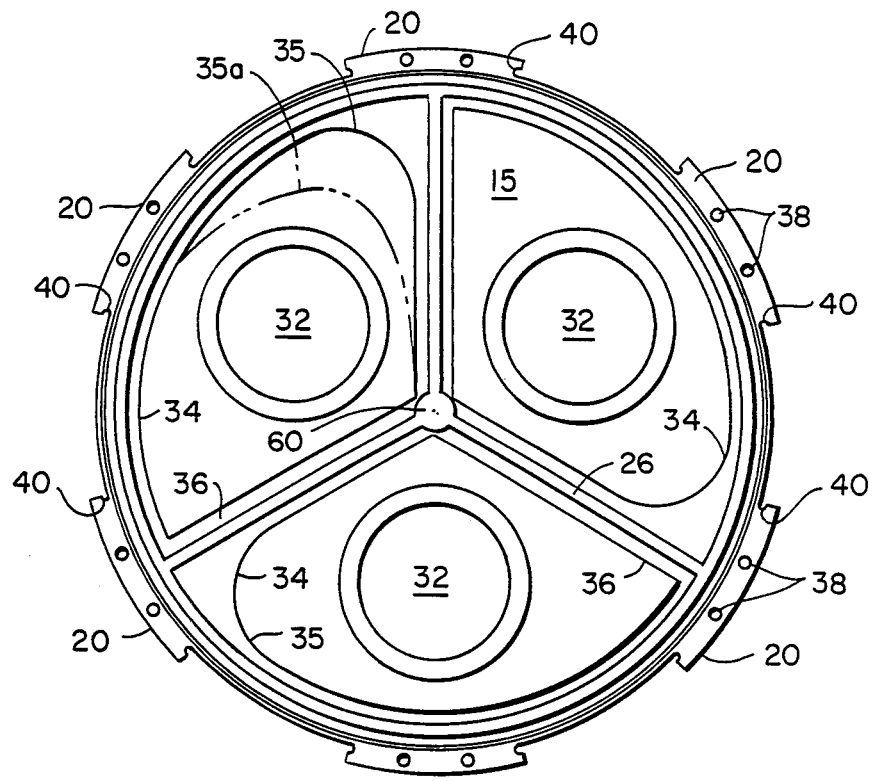
FIG. 4 is a detailed plan view from above of one of the symmetrical halves selected as the cover.

Each base is also formed with a plurality of outer score lines or tear lines 34 formed outside and around the inner score lines 30. The outer score lines 34 in this example are also three in number, one for each compartment and define unloading holes to be opened for removing animals from the respective compartments. As shown in FIG. 4, the material of base 15 may be lifted at the rounded end 35 of the score line 34 facilitated for example by a tab (not shown) to the raised position 35a exposing the compartment for unloading animals. The straight line portion 36 of outer score line 34 may be used as a hinge for full access to the compartment. Note that the inner score line portion 30 of the base forming the loading hole and the lid or cap 32 are entirely within the outer score line 34.

As also shown in FIG. 4, the tabs or flanges 20 may also be formed with complementary alignment elements 38 for aligning the mating halves and tabs for placement of the locking band 22 at the roots of the tabs 20. The alignment elements 38 consist of a pin and a hole on each tab or flange so that each half is formed from the same mold and is identical. When one half is turned over complementary pins and holes of adjacent flanges meet and engage. The flanges or tabs 20 are formed at the roots of the tabs with indents 40 for sliding one end of the slots 24 of the band 22 into the indents, securing the locking band in place. There is no requirement that the ends of the locking band be cinched together for example as a belt because the holding action of the locking band is not achieved by a "belting" action around the "waist" of the container. Rather it is the holding action of the slots 24 of the band 22 at the roots of tabs 20 which securely holds the mating halves together. The ends of the locking band are however joined for example by bonding, heat sealing, sonic welding, punch closure, or clamping so that the locking band and container are "tamper proof." The end of the slots 24 also slide into the indents or slots 40 at the roots of the tabs so that the locking band 22 remains in place during shipping. The locking band 22 is provided with indicia such as upward pointing arrows with legend e.g. "This Side Up" indicating the selected upward or cover half.

Referring to FIGS. 2, 3 and 7, a circular screening wall 45 is formed around the circumference of the container inside the outwardly tapering side walls 16. The screening wall 45 forms the circumferential or outer boundary of the sector shaped compartments. The screening wall 45 is composed of a metal screen layer 46 facing the compartments and an air filter layer 48 facing the ventilating side walls 16. The edges of the metal screen layer 46 are folded over the air filter layer 48 for increased structural support of the screening wall. The circular screening wall 45 is seated in circular recesses, grooves or wells formed around the perimeter of each base with square edges and close fit for a rodent proof joint.

Figure 5:
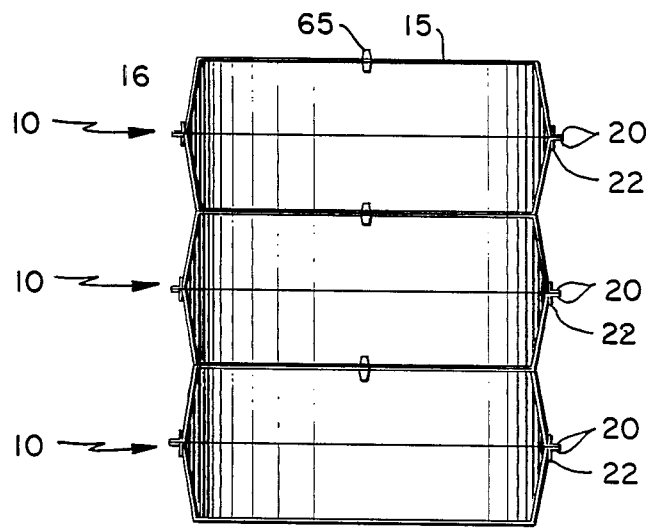
FIG. 5 is a diagramatic side cross sectional view of a stack of multiple animal shipping containers showing the interfitting stacking lugs at the respective center posts.

The animal shipping containers 10 may be stacked as illustrated in FIG. 4. As shown in further detail in FIGS. 5A, 5B and 5C, the container halves 12, 14 are formed with a central opening 60 at the center of each base 50. Furthermore, the radial partitions merge to form the effective center post structure 28 aligned with the central opening 60. The center post 28 is in turn formed with hollow or open ends 62 aligned with the central openings 60.

Each container 10 is also provided with an elongate stacking lug 65 formed with tapered ends 66 and 68 for inserting in the aligned central openings 60 and hollow or open ends 62 of the center posts 28. The stacking lugs 65 may be molded at the same time as the mating halves 12, 14 and joined to the bases 15 by a web 70.

In using the animal shipping container 10, the necessary loading holes are first opened in the compartments to be used by removing a circular portion of the base 15 of the cover half 12 within the inner score line 30. After loading the animals in a compartment, a separate lid, cover or loading hole insert 32 is placed in the loading hole and secured, for example, as shown in FIGS. 6 and 6A The lid or cover 32 is formed with a brim or collar 72 which rests on the base 15 while the insert portion 74 extends within the loading hole frictionally engaging the rim of the loading hole defined by score line 30. In the example of FIG. 6, the base 15 is formed with pins 78 that project or extend through complementary retaining holes formed in the collar or brim 72. As shown in FIG. 6A, the retaining projections or retaining pins 78 that extend through the complementary retaining holes formed in the collar 72 of the lid 32 are heat pressed or sonically "mashed" to form plastic rivet heads 78a that seal the lid securely in place. The mating halves of the container may be injection molded using thermoplastic material.

In the preferred example of FIGS. 1–4, the container 10 is divided by partitions 25 into three 120 degree sector compartments. Each compartment is bounded by three sides or walls, two sides being partitions 25, and the third being an arc of the ventilated side wall 16. The 120 degree arc of the side wall forms the largest boundary wall of each compartment with the advantage that the longest boundary wall is ventilated for ample external aeration. Alternatively, of course, the container housing itself may constitute one compartment or it may be divided into different numbers of sectors for example in the range of 2–6 sector compartments. For numbers of sector compartment divisions of 6 or less, the arc of the ventilated side wall remains the longest boundary wall of the compartment through other numbers of compartments may be used. The sector sizes, for example in sector degrees are generally equal for accommodating substantially equal numbers of small animals. However sector compartments of different size, by different number of degrees may be formed within the container housing, for example, for accommodating different numbers of animals or different size animals in the respective compartments.

As used in the specification and claims the phrase "substantially circular" is intended to cover planform shapes approaching circular which afford ventilation between the containers in a close packing condition. For this purpose containers with polygonal configuration or planform shape with a large number of facets may be used. For example, polygons with at least approximately 8 or more facets afford substantial ventilation even with close packing of the containers. Although "substantially circular" therefore includes polygonal with large number of facets and elliptical or oval, the preferred configuration is the circular planform shape which optimizes ventilating space and access around the containers in the close packing arrangement.

While the invention has been described with reference to particular example embodiments it is intended to cover all variations, modifications and equivalents within the scope of the following claims.

What is claimed is:

1. An animal shipping container comprising
   a generally cylindrical configuration container housing comprising upper and lower substantially circular bases and ventilated side walls extending between the perimeters of the bases;
   at least one base being formed with a first access way defining a loading hole having a first perimeter;
   lid means for sealing said loading hole; and
   at least one base being formed with at least one tear open score line defining an unloading hole having a second perimeter different from the first perimeter of the loading hole to be opened by tearing along the score line for unloading animals from the container housing.

2. The shipping container of claim 1 wherein the bases are formed with a central opening at the center of each base and center post means positioned in the container with hollow or open ends aligned with the central opening of each base and further comprising elongate stacking lugs tapered at each end for inserting in the aligned central openings and hollow end center post means of adjacent containers for stacking containers.

3. An animal shipping container comprising:
   a generally cylindrical configuration container housing comprising upper and lower substantially circular bases and ventilated side walls extending between the bases;

at least one base being formed with at least one tear open inner score line defining a loading hole to be opened by tearing along the at least one inner score line for loading animals into the container housing;

lid means for covering a loading hole opened in a base of the container housing; and at least one base being formed with a tear open outer score line around at least a portion of a tear open inner score line for defining an unloading hole to be opened by tearing along the outer score line for removing animals from the container housing.

4. The animal shipping container of claim 3 wherein the at least one tear open inner score line comprises a closed loop for removing a portion of the base to define a loading hole and receive said lid means.

5. The animal shipping container of claim 3 further comprising radial partitions extending between the bases defining sector shaped compartments in the container housing, at least one loading hole and one unloading hole being defined for each compartment.

6. An animal shipping container comprising: a generally cylindrical configuration container housing comprising mating halves each comprising a substantially circular base and ventilated side wall depending or extending from the base;

a plurality of mating tabs or flanges extending from the perimeter of the side wall of each mating half for flush engagement of pairs of mating tabs from the respective mating halves around the container;

and a slotted band formed with spaced slots around the center of the band for sliding over flush pairs of mating tabs around the container for securing the mating halves together at the roots of the tabs.

7. The animal shipping container of claim 6 wherein the side walls depending or extending from each base are tapered outwardly from the base to form an expanded circular waist around the middle of the housing with waist diameter slightly greater than the base diameter.

8. The animal shipping container of claim 7 further comprising screening wall means formed around the circumference of the container inside the outwardly tapering side walls forming a boundary extending around the perimeter of the respective bases.

9. The animal shipping container of claim 8 wherein the screening wall means comprises a metal screen facing the center of the container housing and an air filter layer adjacent to the metal screen facing the side walls.

10. The animal shipping container of claim 9 wherein the mating halves are substantially symmetrical about a center plane between the mating halves, said mating halves being interchangeable for use as either the top cover half or bottom half of the container.

11. The animal shipping container of claim 6 wherein the container halves are formed with central opening at the center of each base and center post means positioned in the container with hollow or open ends aligned with the central opening of each base and further comprising elongate stacking lugs tapered at each end for inserting in the aligned central openings and hollow end center post means of adjacent containers for stacking containers.

12. An animal shipping container comprising:

a generally cylindrical configuration container housing comprising two mating halves each comprising a substantially circular base and ventilated side wall depending or extending from the perimeter of the base;

partition means defining a plurality of compartments in the container housing;

at least one base being formed with a plurality of first access ways defining a loading hole having a first perimeter for each compartment;

a plurality of lid means for sealing each loading hole; and at least one base being formed with tear open score line means defining a plurality of separate unloading holes for the respective compartments, each unloading hole having a second perimeter different from the first perimeter of the loading hole for the respective compartment to be opened by tearing along the score line means for separately unloading animals from the respective compartments of the container housing.

13. The animal shipping container of claim 12 wherein the partition means comprise radial partitions extending between the bases of the mating halves defining sector shaped compartments in the container housing.

14. The animal shipping container of claim 12 wherein at least one base is formed with a plurality of tear open inner score lines defining loading holes to be opened by tearing along the inner score lines for separately loading animals into the respective compartments of the container housing, and a plurality of tear open outer score lines formed around at least a portion of the inner tear open score lines, said tear open outer score lines defining unloading holes to be opened by tearing along the outer score lines for removing animals from the respective compartments.

15. The animal shipping container of claim 14 further comprising lids for covering opened loading holes during shipping, said tear open inner score lines comprising closed loops for removing portions of the base to define said loading holes and received said lids.

16. The animal shipping container of claim 12 wherein the generally cylindrical configuration container mating halves are each formed with a plurality of mating tabs or flanges extending from the perimeter of the side wall for flush engagement of pairs of mating tabs from the respective mating halves around the middle of the container, and further comprising a slotted locking band formed with elongate spaced slots around the band for sliding over flush pairs of mating tabs around the waist of the container for securing the mating halves together at the roots of the tabs.

17. The animal shipping container of claim 16 wherein the side walls depending or extending from each base are tapered outwardly from the base to form an expanded circular waist around the middle of the housing with waist diameter slightly greater than the base diameter.

18. The animal shipping container of claim 17 further comprising screening wall means formed around the circumference of the container inside the outwardly tapering walls and around the compartments, said screening wall means forming an outer compartment boundary extending around the perimeter of the respective bases.

19. The animal shipping container of claim 18 wherein each base is formed with indented grooves for receiving the partitions and screening wall means.

20. The animal shipping container of claim 18 wherein the screening wall means comprises a metal screen forming a cylindrical configuration inner wall facing the compartments and an air filter layer adjacent to the metal screen facing the ventilated side walls.

21. The animal shipping container of claim 17 wherein the mating halves are formed to be substantially symmetrical about a center plane through the waist of the container and interchangeable for use as either the top cover half or the bottom half.

22. An animal shipping container comprising:
a generally cylindrical configuration container housing comprising two mating halves each comprising a substantially circular base and ventilated side wall depending or extending from the base, said side walls of the respective mating halves being constructed and arranged to meet and form a substantially circular waist around the middle of the container housing;
radial partitions extending between the bases of the two mating halves forming a plurality of sector shaped compartments within the container and providing structural support between the bases;
at least one base being formed with a first set of a plurality of tear open inner score lines defining a plurality of separate loading holes to be opened by tearing along the inner score lines for loading animals into the respective compartments of the container housing, said tear open inner score lines comprising closed loops for removing portions of the base to define said loading holes and receive the lid means;
a plurality of lid means for covering loading holes opened in a base;
and a plurality of tear open outer score lines formed in at least one base around at least a portion of the inner score lines, said outer score lines defining unloading holes to be opened by tearing along the outer score line for removing animals from the respective compartments of the container housing.

23. The animal shipping container of claim 22 wherein the container halves are formed with a central opening at the center of each base and center post means positioned in the container with hollow or open ends aligned with the central opening of each base.

24. The animal shipping container of claim 23 further comprising an elongate stacking lug tapered at each end for inserting in aligned central openings and hollow end center post means of adjacent containers for stacking containers.

25. The animal shipping container of claim 24 wherein the radial partitions integrally join the center post forming sector shaped compartments extending and expanding in the radial direction from the center post.

26. The animal shipping container of claim 22 wherein the generally cylindrical configuration container mating halves are each formed with a plurality of mating tabs or flanges extending from the perimeter of the side wall for flush engagement of pairs of mating tabs from the respective mating halves around the middle of the container, and further comprising a slotted locking band formed with elongate spaced slots around the band for sliding over flush pairs of mating tabs around the waist of the container for securing the mating halves together at the roots of the tabs.

27. The animal shipping container of claim 22 wherein the mating halves are formed to be substantially symmetrical about a center plane between the mating halves, said mating halves being interchangeable for use as either the top cover half or bottom half of the container.

* * * * *